United States Patent [19]

Wilkie et al.

[11] Patent Number: 4,486,379
[45] Date of Patent: Dec. 4, 1984

[54] PROCESS FOR FORMING AN INTEGRAL HINGED SINGLE WALL BLOW MOLDED CONTAINER

[75] Inventors: Robert R. Wilkie, Roanoke Rapids, N.C.; Charles S. Cooke, Mauldin, S.C.

[73] Assignee: W. R. Grace & Co., Cryovac Div., Duncan, S.C.

[21] Appl. No.: 505,153

[22] Filed: Jun. 17, 1982

Related U.S. Application Data

[62] Division of Ser. No. 133,778, Mar. 26, 1980, abandoned.

[51] Int. Cl.³ .................. B29C 17/07; B29C 17/14
[52] U.S. Cl. .................... 264/526; 264/523; 264/527; 264/536; 264/540
[58] Field of Search ............ 264/523, 524, 525, 527, 264/531, 536, 537, 540, 506, 526; 425/522, 525, 527; 215/1 C

[56] References Cited

U.S. PATENT DOCUMENTS

| | | | |
|---|---|---|---|
| 2,248,898 | 7/1941 | Ross et al. | 264/506 |
| 2,687,157 | 8/1954 | Cowan | 150/0.5 |
| 3,292,252 | 12/1966 | Reading | 264/536 X |
| 3,524,488 | 8/1970 | Scholle | 215/1 C X |
| 3,659,999 | 5/1972 | Shurman | 425/525 |
| 3,714,311 | 1/1973 | Steranka | 425/522 X |
| 3,795,265 | 3/1974 | Schurman | 150/0.5 |
| 3,939,236 | 2/1976 | Hahn | 264/53 |
| 4,082,827 | 4/1978 | Chlystun | 264/98 |
| 4,120,635 | 10/1978 | Langecker | 425/522 X |
| 4,176,413 | 12/1979 | Whitney | 264/520 |

FOREIGN PATENT DOCUMENTS

| | | | |
|---|---|---|---|
| 804404 | 1/1969 | Canada . | |
| 881806 | 9/1971 | Canada . | |
| 1021275 | 11/1977 | Canada . | |
| 1039208 | 9/1978 | Canada . | |
| 1250104 | 9/1967 | Fed. Rep. of Germany | 264/536 |
| 2347528 | 11/1974 | Fed. Rep. of Germany . | |
| 49-41111 | 7/1974 | Japan | 264/531 |
| 55-27256 | 2/1980 | Japan | 264/506 |
| 1167513 | 10/1969 | United Kingdom | 264/536 |

*Primary Examiner*—Jan Silbaugh
*Attorney, Agent, or Firm*—John J. Toney; William D. Lee, Jr.; Joseph P. Harps

[57] ABSTRACT

An integral hinged blow molded container having a single wall is produced by inflating a parison within a mold having a hinge forming area with a draw ratio of greater than 1 whereby the parison is reduced in thickness within the hinge forming area relative to the adjacent area. The thus formed parison is severed about a circumference adjacent the formed hinge to create a top portion and a bottom portion openable and closable about the hinge.

4 Claims, 6 Drawing Figures

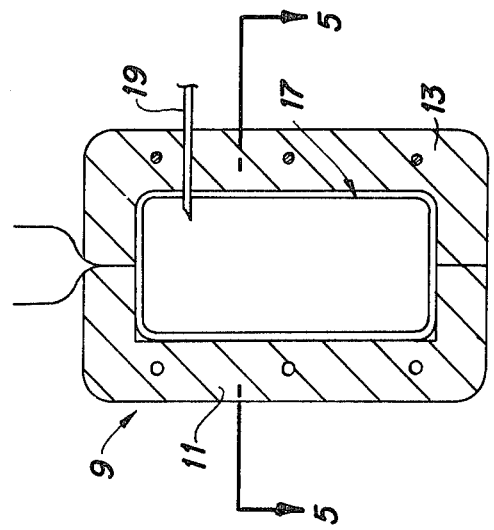
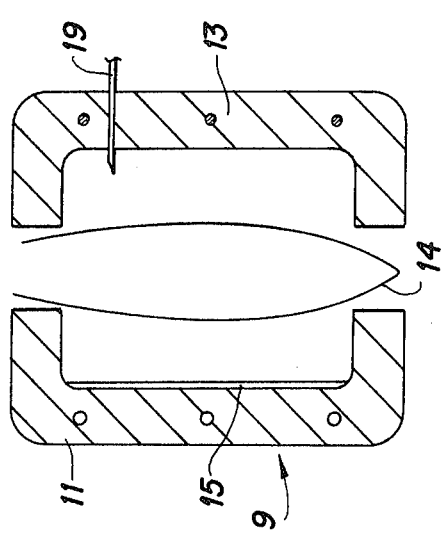
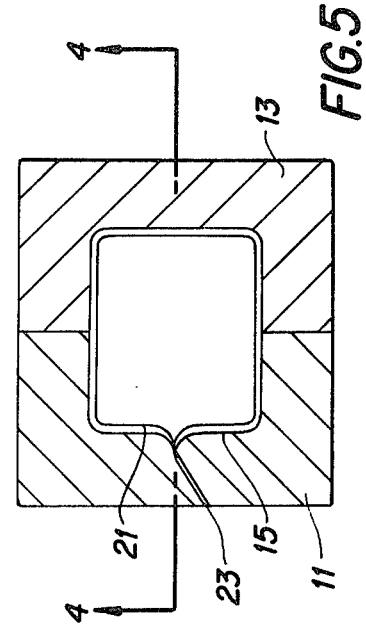
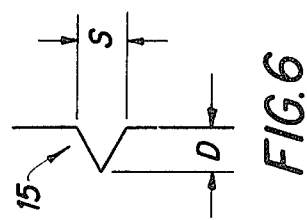

PROCESS FOR FORMING AN INTEGRAL HINGED SINGLE WALL BLOW MOLDED CONTAINER

This is a division of application Ser. No. 133,778, filed Mar. 26, 1980, now abandoned.

BACKGROUND OF THE INVENTION

This invention relates generally to the art of blow molded containers and the molding thereof and more particularly to the art of forming a single-walled blow molded container having an integral hinge portion.

Single-walled thermoplastic containers have been produced in the prior art by utilizing injection molding techniques. Molds for injection molding processes are considerably more expensive and complex than molds utilized for blow molding since a mold surface is required for every surface of the resulting injection molded article. An example of such prior art injection-molding is described in U.S. Pat. No. 2,687,157 to Cowan.

U.S. Pat. No. 3,795,265 to Schurman et al describes a process of producing a double-walled container having an integral hinge. In an aspect of the invention disclosed therein, there is provided a container having a body part and a cover part joined by a hinge continuous with each of them and connecting them for opening and closing the container. The body part, cover part and hinge are formed from a single plastic tubular member. The hinge is a pressed and fused laminate of two webs formed from opposite sides of the tubular member. The hinge is thinner than the adjacent wall area of the body part and the cover part, as a result of the pressing and the pinching of the hinge during its formation.

The method described by Schurman et al involves the use of an unrestrained parison and a mold having male mold parts that make a substantial entry into the mating female mold parts. The method includes extruding the parison, positioning the unrestrained parison in the mold, closing the mold on the parison until the male mold parts project substantially into the mating female mold parts deforming the parison between them into the general configuration of the finished molded parts and inserting a blow needle through the wall of the parison and expanding the parison by providing a pressured differential between the invention and the outside of the parison by blowing a pressurized fluid into the interior of the parison thus forcing the parison into the detailed configuration of the closed mold.

The two mold cavities are joined by land surfaces that register in closely spaced opposed relation when the mold is closed. The parison is closed at opposite ends and pinched upon itself intermediate its ends, upon the closing of the mold, and compression molded at its intermediate pinched area between the land surfaces to form a hinge separating the parison into a pair of hollow compartments.

While the product described in the above referenced United States patent provides an excellent double-walled container with an integral hinge, it is not always necessary for a container to have the double-wall construction described therein.

SUMMARY OF THE INVENTION

It is thus an object of this invention to provide a single-walled blow molded container having a top portion and a bottom portion connected by an integral hinge portion.

It is a further object of this invention to provide a blow molding process for producing a single-wall blow molded container with top and bottom portions connected by an integral hinge portion.

It is a further object of this invention to provide a process of producing a single-walled blow molded container having an integral hinge formed during the process of blow molding.

It is a further and more particular objective this invention to provide a blow molding apparatus having the capability of forming a hinge portion during the blow molding process.

These as well as other objects are accomplished by inflating a parison within a mold having a hinge forming area with a geometry to create a draw ratio of greater than 1 to 1 whereby the parison is reduced in thickness within the hinge area as compared to the area immediately adjacent the hinge area. The parison is severed along the circumference coincidental with the hinge area to form top and bottom sections connected by the hinge section.

BRIEF DESCRIPTION OF THE DRAWING

FIG. 3 is a section view of a blow mold in accordance with this invention.

FIG. 4 is a view of the blow mold of FIG. 3 in the closed position.

FIG. 5 is a view along the line 5—5 of FIG. 4.

FIG. 6 is a blow up of the hinge forming section of a mold in accordance with this invention.

DETAILED DESCRIPTION

In accordance with this invention, it has been found that a single-walled blow molded container having an integral hinge may be formed by deep drawing a hinge portion during the blow molding process. The molded parison with the deep drawn hinge portion is severed along a circumference contiguous with the hinge portion whereby the container is openable and closable about the hinge area. Further and more particular description will be given with reference to the various figures of drawing.

Figure 1:
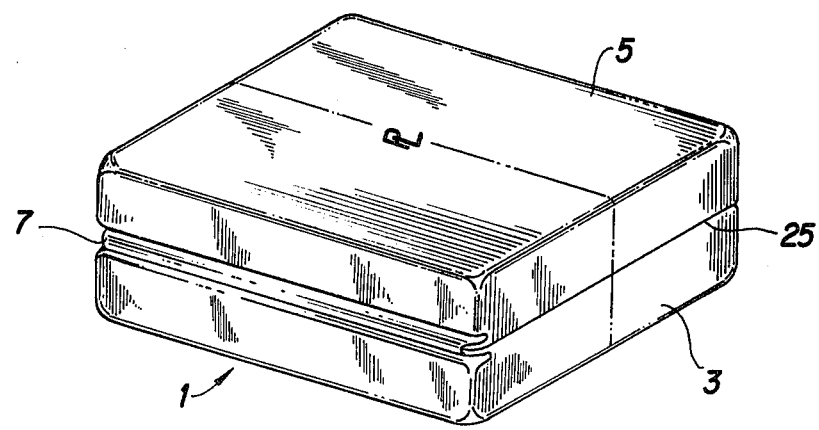
FIG. 1 is an isometric view of a container in accordance with this invention in the closed position.

A container 1, in accordance with this invention, is shown in an isometric view within FIG. 1 of the drawing. The container comprises a bottom section 3, a top section 5 and a hinge portion 7. While this description is given utilizing as points of reference the top section and bottom section, it is understood that these descriptive terms are for the purpose of reference only and relate only to the normal orientation of the container and are not necessarily limited to a particular orientation wherein the bottom section is of lower elevation than the top section.

Figure 2:
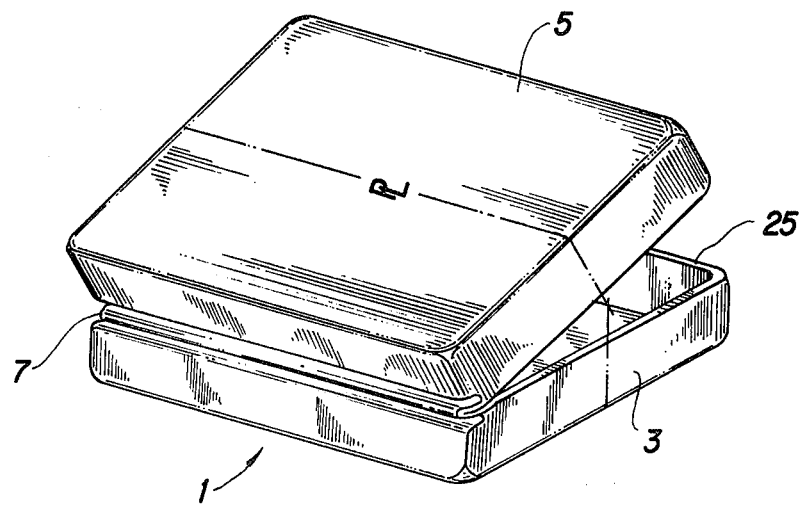
FIG. 2 is an isometric view of the container of FIG. 1 in a partially open position.

FIG. 2 of the drawing shows the container 1 in a partially open mode. It is seen from this view that the container is of a totally unitary construction, being made of but a single section of thermoplastic material with the top section 5, bottom section 3 and hinge portion 7 all integrally joined into but a single container. The process of manufacturing the case or container, in accordance with this invention, will be given in the remaining description.

A cross section of a blow mold, in accordance with this invention, is illustrated in FIG. 3 of the drawings. Shown in FIG. 3 is a blow mold 9 in the open position and comprising mating halves 11 and 13. Suspended between the mating halves 11 and 13 is a parison 14. It is seen that when the mold sections 11 and 13 are in their mated position, they define a cavity into which the parison 14 is inflated. While the parison 14 is shown as a closed tubular form in FIG. 3, it is understood that the initial start-up form would be an open tubular form which would then be pinched closed by the closing of the mold sections 11 and 13. The parison 14 originates from a conventional extrusion source (not shown).

Any blow moldable thermoplastic material having the requisite flexibility for the hinge may be utilized. Such materials include high density polyethylene, polypropylene, polyvinyl chloride and elastomeric polyolefins. The extrusion die may be programmed so as to vary the wall thickness of various portions of the parison so as to minimize any effects of sagging. Such techniques are well known in the art.

FIG. 3 illustrates the hinge forming area 15 which may be seen with a greater degree of clarity in FIGS. 5 and 6. FIG. 4 of the drawing shows the mold sections in the closed position with the parison having been inflated so as to conform to the geometry of the mold. The inflated parison is generally designated by the numeral 17. The inflation step is carried out by the use of needle 19 which communicates with a source of pressurizing fluid. Such inflation techniques are well known in the art.

The hinge forming area is best seen in FIG. 5 which shows the hinge forming area as a notch or v-shaped portion as indicated at 15. It is seen that, upon inflation of the parison, the parison conforms to wall 21 and then into the notched hinge forming area 15. It is understood that the thermoplastic material which passes the wall 21 and proceeds into the notched area 15 will of necessity be of thinner construction than the thermoplastic material which rests against wall 21 due to the section of material conforming to a larger area than that material which conforms to the vertical wall 21.

In accordance with this invention, it has been found that by significantly stretching and deep drawing the thermoplastic material into a hinge forming area, the thinning and stretching caused by such deep drawing produces a thinned hinge area which is both oriented and of significantly greater flexibility than the adjacent areas. FIG. 5 of the drawing illustrates a vent 23 which aids the deep drawing of the thermoplastic material by permitting any entrapped gases to escape during the deep drawing of the hinge area. The vent 23 may optionally be vacuum assisted so as to further aid in the stretching and deep drawing of the hinge area. FIG. 6 of the drawing shows an enlarged view of the hinge forming area 15 illustrated in FIG. 5. This view is for the purpose of describing a critical feature of this invention in that the depth of draw to the suspended length ratio must be greater than 1 in order to produce an effective hinge. The depth of draw is designated by the letter "D" in FIG. 6 while the suspended length dimension is designated by the letter "S". It is critical that the ratio D/S be at least 1 or greater. If the ratio D/S is substantially less than 1, the hinge does not possess the required strength or flexibility to function as a hinge for practical purposes. The parameter D/S is frequently referred to in the art as the draw ratio. The art also frequently refers to the draw ratio being the final area divided by the initial area of thermoplastic material. If the latter ratio is utilized, the critical draw ratio utilizing areas is then $\sqrt{5}$ for the particular geometry illustrated in the drawings.

Once having inflated the parison to the geometry of the mold including the hinge forming area, the resulting closed configuration is severed about a cicumference contiguous with the hinge portion 7 as shown in FIG. 2. The circumference contiguous with the hinge portion is designated by the numeral 25 in FIGS. 1 and 2. The process of severing is carried out by conventional techniques such as placing the container in a cradle and sawing along a defined path so as to mate the severance line with the hinge portion 7.

While the hinge forming area 15 of the mold is shown as being of basically triangular cross section, it is understood that the shape of the hinge may be any desired shape. For example, the hinge forming area may be rectangular or generally circular in cross section. The only critical feature is that the draw ratio (depth of draw to suspended length) be 1 or greater.

The container and molds illustrated in the various figures of drawings illustrate a hinge forming area 15 which is parallel to the direction of parison drop and on a mold wall adjacent the wall having a parting line. The parting line of the mold shown in FIGS. 4 and 5 is illustrated in FIGS. 1 and 2 by the designation of PL in the dashed line associated therewith. The hinge forming area, however, may be on any convenient wall and if on a wall which defines the parting line, the hinge forming area is preferrably coincidental with the parting line. If the hinge forming area is desired to be on the wall containing the parting line and does not lie coincidental with the parting line, special mold construction is necessitated so as to make it possible to remove the molded article from the mold.

An advantageous feature of the single-walled blow molded container of this invention is that either or both the top and bottom sections may be conformed to the geometry of an article which it is intended to house. Such conformity would appear on the interior and the exterior of the container so as to make the geometry of the housed article readily apparent.

It is thus seen that by this invention a novel single-walled blow molded container having a deep drawn integral hinge is provided. It is further seen that the process of this invention, in conjunction with the unique blow mold of this invention, makes it possible to provide such a container. As many variations will be apparent to those of skill in the art from a reading of the above specification, which is exemplary in nature, the spirit and scope of the present invention is set forth only by the breadth of the following appended claims.

What is claimed is:

1. A blow molding process for forming a parison into an integral single-walled container comprising top and bottom portions connected together by an integral hinge portion, said process comprising the steps of:

inflating said parison within a hollow mold to conform the parison to the configuration of the interior surface of said mold, said interior surface comprising a hinge forming area adapted to create a draw ratio of greater than 1, whereby hinge forming portion of said parison is simultaneously deep drawn to a draw ratio of greater than 1, thinned and oriented;

removing the thus inflated parison from the mold; and severing a circumference of said parison which is contiguous with said hinge forming portion to form said container.

2. The process of claim 1 wherein said hinge forming area is generally parallel to a direction of drop of the parison.

3. The process according to claim 1 wherein the hinge forming area is generally perpendicular to a direction of drop of the parison.

4. The process of claim 1 wherein vacuum means are utilized to assist in said deep drawing, thinning and orientation of said hinge forming portion.

* * * * *